United States Patent Office 3,426,417
Patented Feb. 11, 1969

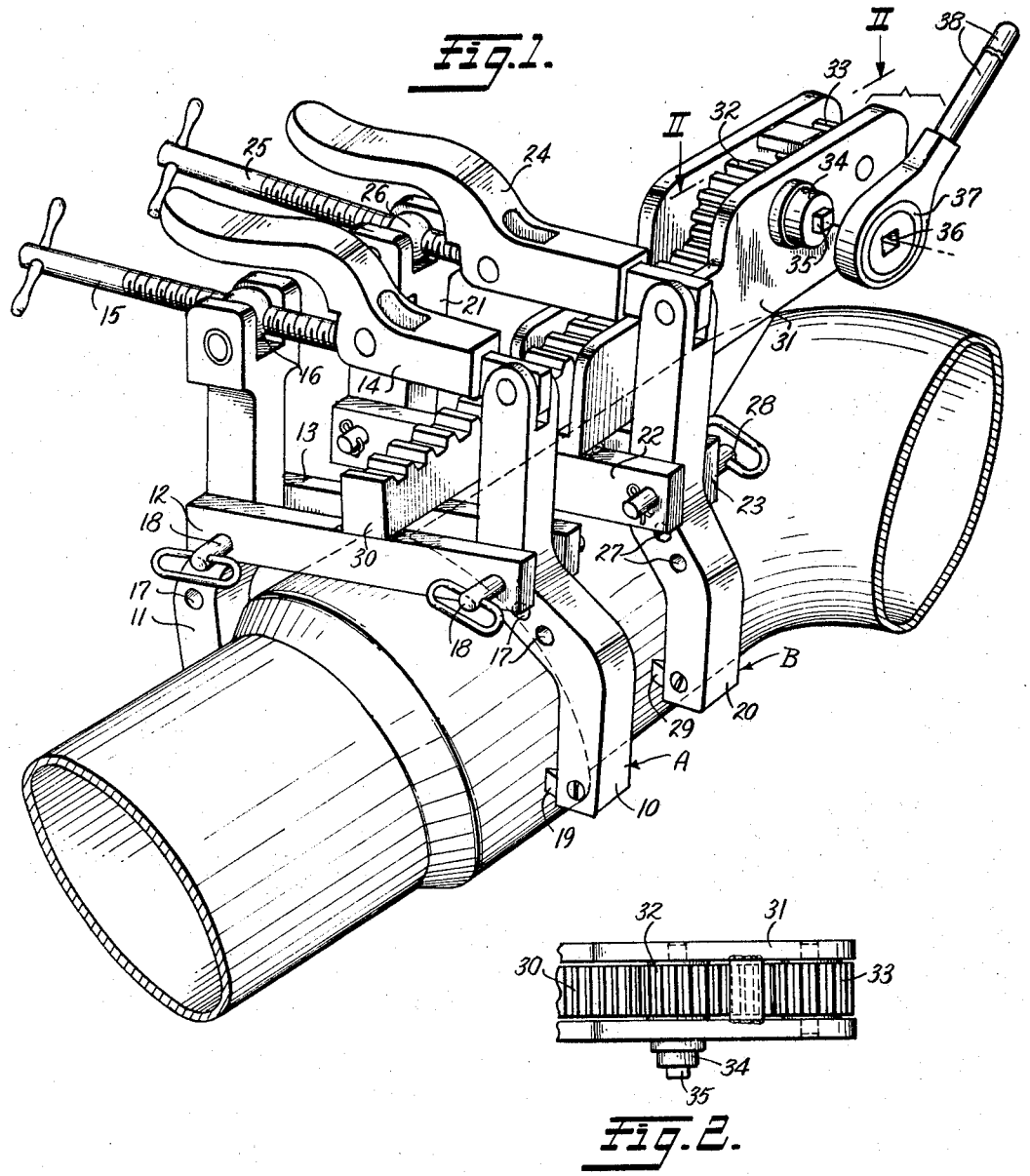

3,426,417
TOOL FOR JOINING AND SEPARATING
PIPE JOINTS
Joe H. Austin, Box 4237, Tyler, Tex. 75701
Filed Feb. 13, 1967, Ser. No. 615,521
U.S. Cl. 29—237                           6 Claims
Int. Cl. B23p 19/04

ABSTRACT OF THE DISCLOSURE

This invention relates to a compact tool which may be clamped on to two mating pipe ends to force them together to form a joint, or separate them if they have already been made up into a joint. The clamping mechanism has a toggle action.

Summary

This invention relates to a tool comprising two aligned toggle actuated clamps, one of which is fixed to a rack and the other to a gear which meshes with the rack. When one of these two clamps is mounted on each of two aligned, mating, pipe ends, and the gear is turned, the two ends are forced together or pulled apart, depending upon the direction in which the gear is turned.

The device is adjustable to pipes of different sizes, compact so that it may be used in relatively inaccessible places, and adapted to operate satisfactorily even when one of the pipes is an elbow or tee containing a bend quite close to the joint.

Description of the figures

A preferred embodiment of my invention will now be described, with reference to the annexed drawing, in which:

FIGURE 1 is a fragmentary perspective view of the tool for joining or separating pipe joints; and FIGURE 2 is a fragmentary plan view taken on the line II—II of FIG. 1.

Like reference numerals denote like parts throughout the several views.

Turning now to the drawing, it will be seen that my device comprises a first clamp indicated generally by the reference character A and comprising the jaws 10, 11 connected near their mid-points by the cross-arms 12, 13 and at their upper ends by a toggle assembly comprising a handle 14 pivotally connected to the jaw 10, a screw 15 pivotally connected at one end to the handle 14, and an internally threaded swivel-nut 16. The screw is threaded into the swivel nut, and the swivel nut is rotatably mounted at the upper end of the jaw 11. Both jaws are provided with a plurality of holes 17 adapted to receive the removable pins 18 by means of which they are connected to the cross-arms. The jaws may be adjusted to grip different sizes of pipe by connecting the cross-arms 12, 13 between different pairs of the holes 17. Each jaw is provided with teeth 19.

A second clamp indicated generally by the reference character B comprises essentially identical parts, i.e. jaws 20, 21, cross-arms 22, 23, handle 24, screw 25, swivel-nut 26, adjustment holes 27, pins 28, and jaw teeth 29.

The cross-arms 12, 13 of clamp A are welded to the end of a rack 30, while the cross-arms 22, 23 of clamp B are welded to the end of a channel member 31 in which said rack is slidably mounted. A gear wheel 32 is rotatably mounted in the channel member 31 near the end thereof remote from the clamps, and meshes with the rack 30. An idler 33 is mounted in the channel member beyond the gear 32, and acts to guide the rack 30.

The gear 32 is mounted on an axle 34 which has a polygonal end 35 which mates with the polygonal socket 36 in a ratchet 37 carried by a lever 38. Since either side of the lever can be positioned toward the channel member, the ratchet can be made to operate in either direction.

In operation, each clamp is adjusted to the size of pipe to be handled by adjusting the position of the cross-arms by means of the pins and the holes in the jaws. The screws are adjusted so that the handles may be swung up with the jaws in place, one on each of two mating sections of pipe to be joined. The jaws are then swung down, forcing the upper ends of the jaws apart and clamping their lower ends firmly against the pipe ends. The points at which the handles are pivoted to the screws are forced just past the lines joining the centers of the swivel nuts to the centers of the connections between the handles 14, 24 and the jaws 10, 20, so that the handles are held down by a toggle action until pulled vigorously upward. The lever 38 is then rotated to turn the gear 32, which acts on the rack 30, thus pulling together the two clamps, and the pipe sections held thereby. Obviously, if the lever is turned over and swung in the opposite direction, the effect will be to pull the pipe sections apart.

What is claimed is:

1. A tool for closing and opening pipe joints, said tool comprising first and second pairs of elongated jaw members, individual connecting means for the jaw members of each pair connnecting the jaw members of that pair together, said connecting means being pivotally connected to the associated jaw members at points intermediate the ends of said jaw members, toggle means connecting and pivotally connected to those ends of the jaw members of each pair lying on one side of said connecting means, a rack transversely connected to one of said connecting means, a channel member in which said rack is longitudinally slidable, said channel member being transversely connected to the other connecting means, a driving gear rotatably carried by said channel member and meshing with said rack, and means for rotating said driving gear.

2. A tool as claimed in claim 1 comprising an idler gear also carried by said channel member and meshing with said rack, said idler gear being spaced from driving gear longitudinally of said channel member.

3. A tool as claimed in claim 1 in which each toggle means comprises a handle pivotally connected to one jaw of each pair, a swivel nut pivotally connected to the other jaw of that pair, and an adjusting screw seated in said nut and pivotally connected to said handle.

4. A tool as claimed in claim 1 comprising means for attaching said connecting means to said jaws of any of a plurality of points, thereby varying the width to which said jaws can be opened.

5. A tool as claimed in claim 1 comprising a lever arm carrying ratchet means, said lever arm being detachably and reversibly connected to said driving gear through said ratchet means.

6. A tool as claimed in claim 1 comprising teeth on the ends of said jaw members remote from said toggle means, the teeth on the jaw members of each pair projecting toward the other jaw member of that pair.

References Cited

UNITED STATES PATENTS

| 1,927,688 | 9/1933 | McKee | 29—237 |
| 2,691,211 | 10/1954 | Leiber | 29—237 |
| 2,719,695 | 10/1955 | McKee | 29—237 |

ROBERT C. RIORDON, Primary Examiner.

J. C. PETERS, Assistant Examiner.